June 28, 1966  J. B. JONES  3,257,721
METHOD AND APPARATUS FOR EMPLOYING TORSIONAL VIBRATORY ENERGY
Filed March 16, 1965  5 Sheets-Sheet 2

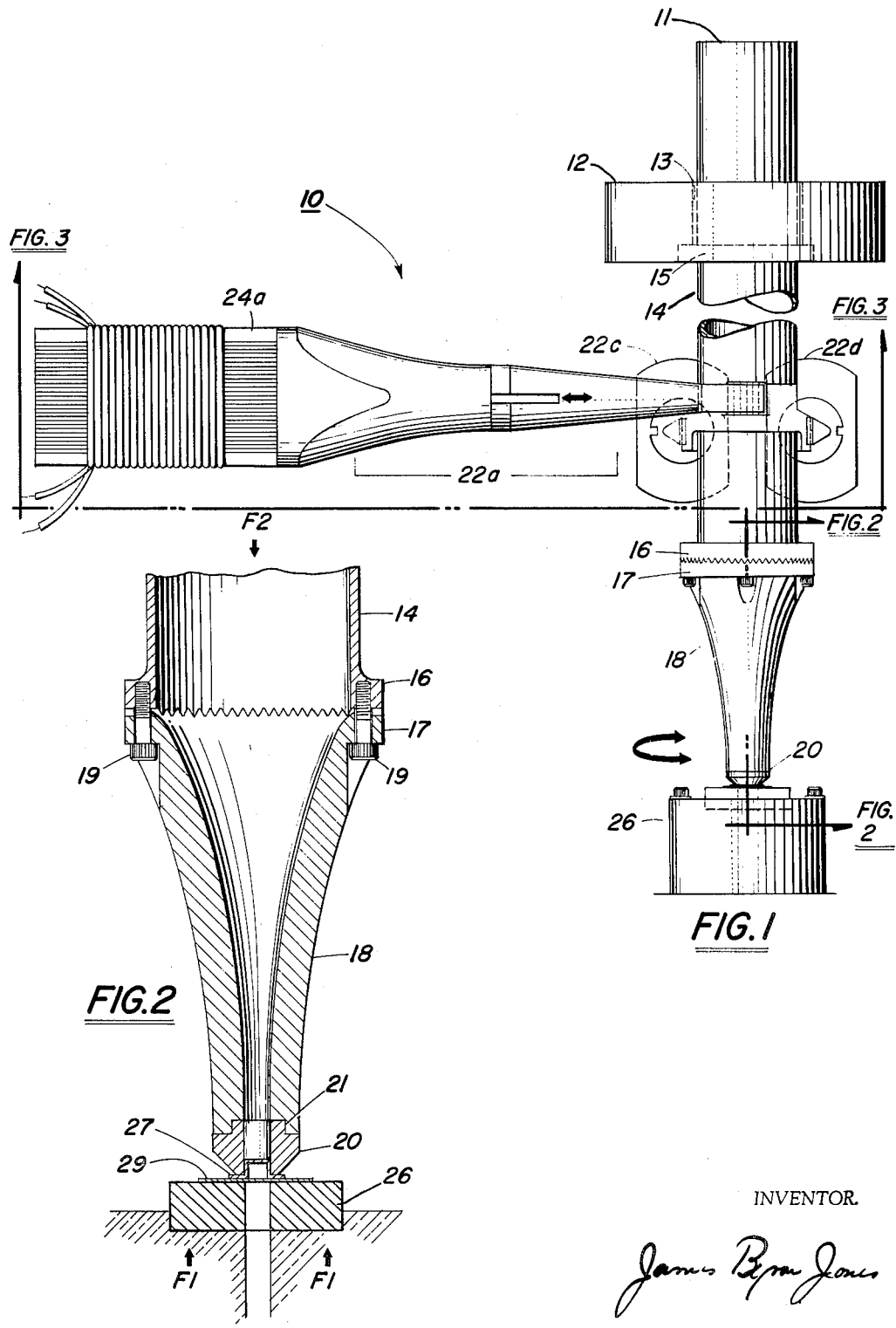

INVENTOR.
James Byron Jones

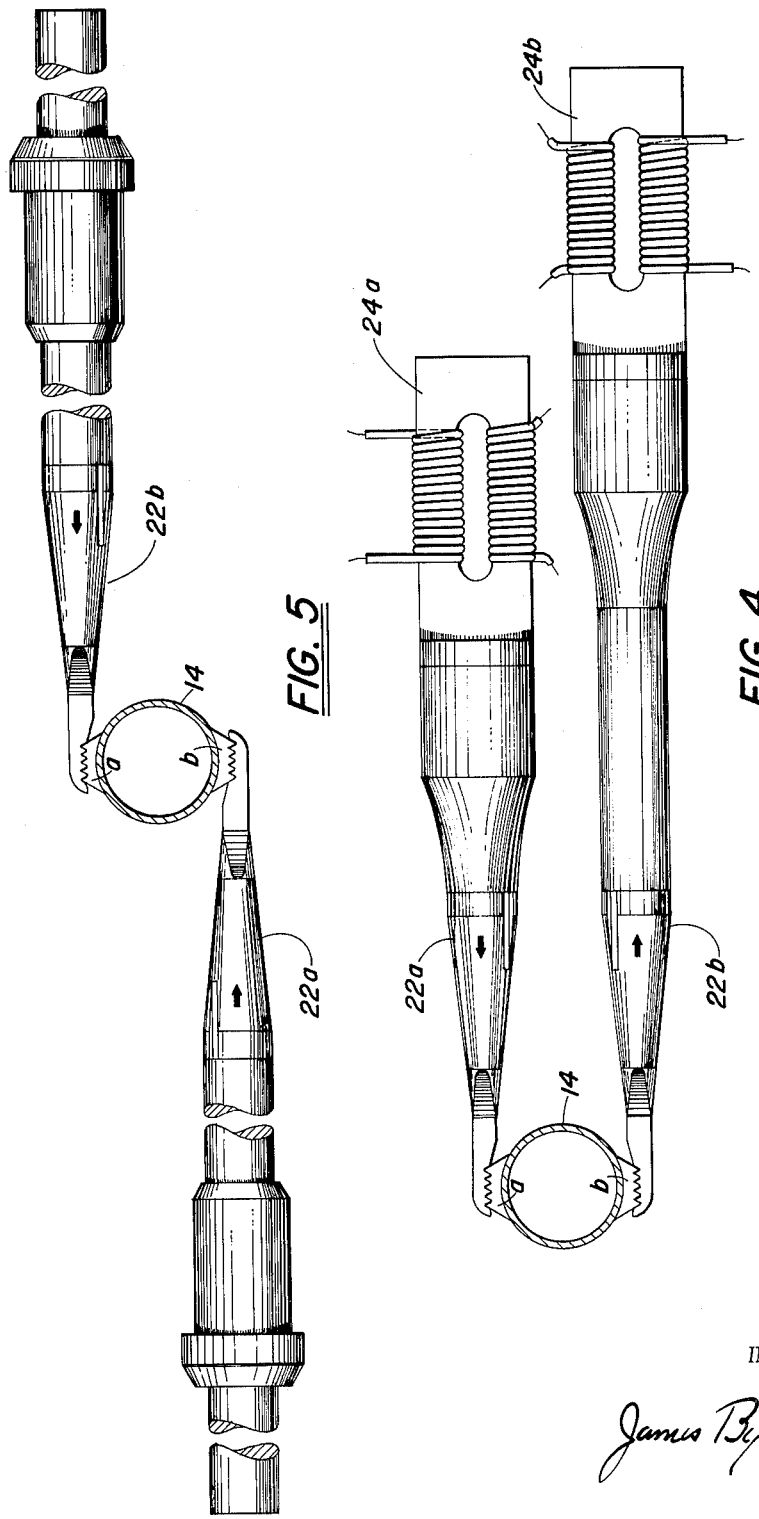

June 28, 1966 J. B. JONES 3,257,721
METHOD AND APPARATUS FOR EMPLOYING TORSIONAL VIBRATORY ENERGY
Filed March 16, 1965 5 Sheets-Sheet 4

INVENTOR.
James Byron Jones

INVENTOR.
James Byron Jones

United States Patent Office 3,257,721
Patented June 28, 1966

3,257,721
METHOD AND APPARATUS FOR EMPLOYING TORSIONAL VIBRATORY ENERGY
James Byron Jones, West Chester, Pa., assignor to Aeroprojects Incorporated, West Chester, Pa., a corporation of Pennsylvania
Filed Mar. 16, 1965, Ser. No. 440,259
15 Claims. (Cl. 29—470.1)

This invention relates to method and apparatus for employing torsional vibratory energy to perform useful work, and more particularly to method and apparatus for vibratory welding and for other applications wherein vibratory energy performs useful work.

It has been proposed heretofore to apply torsional vibratory energy in performing various tasks. See, for example, United States Patent 3,184,841 filed on June 3, 1958 in the names of James Byron Jones and Carmine F. DePrisco entitled "Method and Apparatus Employing Vibratory Energy for Bonding Metals" (of which this application is a continuation-in-part); United States Patent 3,166,840 issued January 26, 1965 in the names of Dennison Bancroft, William C. Elmore, James Byron Jones, and Nicholas Maropis entitled "Apparatus and Method for Introducing High Levels of Vibratory Energy to a Work Area"; United States Patent 3,131,515 issued May 5, 1964 in the name of Warren P. Mason entitled "Method and Apparatus Employing Torsionally Vibratory Energy"; and United States Patent 2,921,372 issued January 19, 1960 in the name of Albert G. Bodine, Jr. entitled "Torsional Vibration Sonic Drill."

In vibratory welding, appropriate use of the torsional mode of vibration has (in addition to other advantages such as the ability to make open-center interruped- or closed-periphery welds of hermetic-seal quality) the advantage of superimposing a shear field onto the static stress fields in a workpiece resulting from a clamping force applied normal to the workpiece surfaces, and it is opposed by the rigidity or shear modulus. The elastic moduli of a material are defined by Lame's constants, and it can be shown that the shear modulus is lower than either the bulk modulus or Young's modulus. Thus, the torsional mode of vibration, when suitably applied, may be more effective in certain applications than are other commonly used in vibratory modes. For example, in certain kinds of vibratory welding, it can provide more efficient welding (with less weldment deformation, less cracking tendency, and a generally more satisfactory weld quality) than is currently realized when the same materials (especially refractory-type materials) are vibratorily spot-welded with uniaxial contacting instead of the torsional contacting mode.

The torsional welding apparatus described in the above mentioned patent application has performed excellently in many applications. However, in other applications certain problems have been encountered. These problems relate to such matters as control of weld area and diameter, and particularly the ability to relate the acoustical impedance of the apparatus to the impedance presented by the material being welded (which is related to weld area and diameter). They and other problems will be more fully discussed hereinafter, and have particular significance with respect to providing efficient welding apparatus and efficient welding in certain applications, as well as with respect to increasing the versatility and the practicability of a given torsional-mode welder, so that it may be used for a variety of welding applications.

The methods and apparatus of the present invention are principally associated with vibratory amplitude transformers and with vital components and factors in connection with such transformers and their utilization.

Torsional-mode vibratory amplitude transformers or torsional tapered horns have been suggested heretofore, as in FIGURE 17 of U.S. Patent 2,921,372 and also column 7, lines 43–64, and claim 11 thereof. However, in that patent a torsional transducer and standing waves are used, no instructions are given for constructing such a taper, and the tapered section is not removable, whereas removability is a salient feature of the present invention.

U.S. Patent 3,131,515 gives no instructions for torsional taper construction, except for the statement in column 2, lines 33–40 (note that the equation in the claims refers merely to the maximum permissible diameter):

"... applicant has discovered that for a torsionally vibrating mechanical transformer of the tapered horn type the *maximum particle velocities and stresses* sustained toward the smaller end of the vibrating mechanical transformer member (horn) *vary inversely with the cross-sectional area ratio between the large and small ends* instead of inversely with the square root of the area ratio, as for the prior art longitudinally driven horn." (Emphasis added.)

This relationship is true for a solid horn, but it has been found that it is not true for a hollow horn such as is preferred in accordance with the present invention. Moreover, U.S. Patent 3,131,515 uses a torsional transducer, describes standing-waves rather than a power delivery situation, and discloses two solid horns in tandem for ease of replaceability of the second horn. These features are not preferred in accordance with the present invention, as may be seen hereinbelow.

Furthermore, the problems associated with the systems of these two patents are not the problems solved by the present invention, and this is particularly true with respect to such matters as acoustical power delivery, acoustical impedance matching, and angular displacement and angular velocity, which are associated with torsional vibration as used herein.

It is an object of the present invention to provide a novel apparatus and method employing torsional mode vibratory energy.

It is another object of the present invention to provide an effective, convenient, relatively inexpensive means for drastically increasing the practicability, adaptability, and versatility of methods and apparatus employing torsional vibratory energy.

It is another object of the present invention to provide a torsional vibration array having a novel acoustical impedance matching arrangement.

It is another object of the present invention to provide a novel torsional transformer arrangement at the work-performing end of vibratory apparatus.

It is another object of the present invention to provide a novel torsional transformer arrangement having replaceability advantages.

It is another object of the present invention to provide a novel method and apparatus for effecting an ultrasonic weld by means of torsional vibrations.

Other objects will appear hereinafter.

For the purpose of illustrating the invention, there is shown in the drawings forms which are presently preferred, it being understood, however, that this invention is not limited to the precise arrangements and instrumentalities shown.

FIGURE 1 is a side view of the apparatus of an embodiment of the present invention which is particularly adapted for effecting ultrasonic welds, especially ultrasonic open-center- interrupted- or closed-periphery welds.

FIGURE 2 is a sectional view taken along the lines 2—2 of FIGURE 1.

FIGURE 4 is a plan view of another embodiment showing two longitudinal-mode transducer-coupling systems attached to the torsional reed of FIGURE 1, both systems extending in the same direction.

FIGURE 5 is a plan view of another embodiment showing two longitudinal-mode transducer-coupling systems attached to the torsional reed of FIGURE 1, the systems extending in opposite directions.

Figure 9:
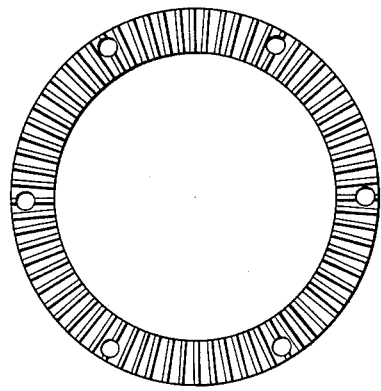
Figure 10:
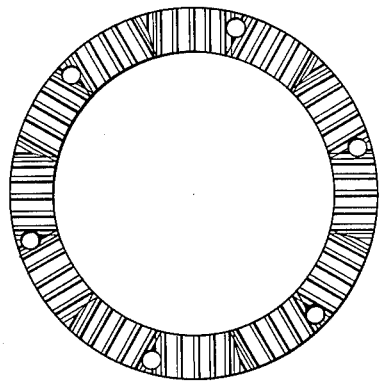
Figure 11:
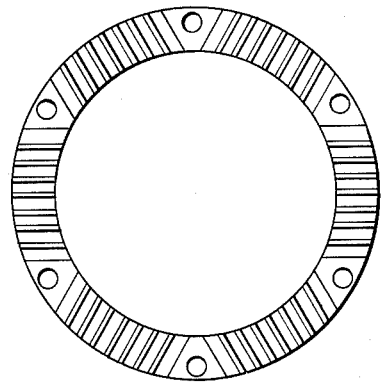

FIGURES 9, 10, and 11 are plan views of three different types of substantially radial tooth pattern suitable for use in joining the torsional transformer to the torsional reed.

Referring to the drawings in detail, wherein like numerals indicate like elements, there is shown in FIGURE 1 an ultrasonic welding apparatus designated generally as 10.

The apparatus 10 includes a mass 12, a torsional reed 14, a torsional mode amplitude transformer 18, an annular tip 20, four longitudinal-mode acoustical coupling members (22a, 22b, 22c, and 22d), four longitudinal-mode transducers (24a, 24b, 24c, and 24d) and a torsionally-noncompliant anvil assembly 26. (The coupling members and transducers may be more clearly seen in FIGURE 3.)

Apparatus 10 is designed to operate at substantially a given frequency, which is preferably a resonant frequency. Each resonant element of apparatus 10 is preferably dimensioned to have an over-all physical length equivalent to an acoustical length of one-half wavelength (or a whole number multiple of one-half wavelength) in the material and geometry of which it is made at the said frequency, in the longitudinal mode or the torsional mode, as the case may be and as will be explained more fully below, so as to have, for efficient operation, a substantially low-stress area at the interfaces including at the junctions between the members 22a–d and the reed 14.

Each of transducers 24a, 24b, 24c, and 24d (of FIGURES 1 and 3) may be of the magnetostrictive type as shown and of conventional construction comprising a half-wavelength-long laminated core of nickel, nickel-iron alloy, or other mangetostrictive material, properly dimensioned to insure axial resonance with the frequency of alternating current applied thereto by coil 25a (or 25b, 25c, or 25d as the case may be), so as to cause it to increase or decrease in length according to its coefficient of magnetostriction. The detailed construction of a suitable magnetostrictive transducer is well known to those skilled in the art and does not form a part of the present invention, and accordingly, no description of its construction will be made herein. It will be appreciated by those skilled in the art that in place of the magnetostrictive transducers 24a, 24b, 24c, and 24d, other known types of transducers may be substituted; for example, electrostrictive or piezoelectric transducers made of barium titanate, quartz crystals, lead zirconate titanate, etc., may be utilized (see for example FIGURE 5).

As aforesaid, each of the transducers 24a, 24b, 24c, and 24d is provided with an excitation coil (25a, 25b, 25c, or 25d). Each excitation coil may be connected to a power supply (incorporating an amplifier, not shown, and oscillator, not shown) suitable for powering the transducers individually or collectively; such equipment is well known to the art. Each transducer is also provided with a polarizing coil 27a (or 27b, 27c, or 27d as the case may be). The desirability of magnetically polarizing each of the magnetostrictive transducers by means of such a polarizing coil, in order for the metal laminations in said transducers to efficiently convert the applied energy from the excitation coil into elastic vibratory energy, is also readily understood by those skilled in the art. Low voltage direct current can be supplied to each of the coils 27a, 27b, 27c, and 27d by battery, rectifier, or other means well known to the art.

The aforesaid power supply system, in a typical example, is capable of producing electrical signals in the range of between about 60 cycles per second and about 300,000 cycles per second. This frequency range is suitable for purposes of the present invention, including as it does frequencies in both the audible range (such as up to about 15,000 cycles per second) and the ultrasonic range (generally above about 15,000 cycles per second). A preferred frequency would be in the range of from about 3,000 to about 75,000 cycles per second, with the optimum being between about 14,000 to about 50,000 cycles per second. Normally, a frequency is chosen which will provide a suitable size of apparatus for a given application or set of applications, with the ultrasonic range having the further advantage of inaudibility for operator comfort.

Thus, apparatus 10 (except for mass 12 and anvil 26) may be constructed to operate at 15,000 cycles per second, for example. In an embodiment of FIGURE 1, a 2000-watt power supply was used to power transducers 24a, 24b, 24c, and 24d at said 15 kc. design frequency.

As is well known to the art, the electrical frequency of the alternating current power supply (such as 60 cycles per second) is changed to match the mechanical or elastic vibratory frequency of the transducers (15,000 cycles per second in this example, as aforesaid).

It is to be noted that the source of high frequency alternating current may be a motor alternator if it has suitable frequency control. Such a motor alternator source is particularly appropriate for applications requiring relatively large amounts of power.

Fixedly secured (preferably by brazing or some other type of metallurgical joint) in end-to-end contact with each of transducers 24a, 24b, 24c, and 24d is an acoustical coupling member (22a, 22b, 22c, and 22d respectively). Coupling members 22a, 22b, 22c, and 22d are preferably made from aluminum-bronze, beryllium-copper, K-Monel, or any other material having low hysteresis, good thermal conductivity, and high transmission efficiency even when strained as much as 0.001-inch per inch, for example. The materials named are non-magnetic and are known to the art for their relatively good acoustical power handling qualities. The relatively good thermal conductivity of beryllium-copper or aluminum-bronze aids in dissipating excess heat from the transducers, thereby lessening the cooling problem. K-Monel has a higher sound velocity than beryllium-copper (and therefore a longer wavelength), but it is sometimes difficult to machine and braze well, particularly in unusual geometries.

Acoustical coupling members 22a–d are essentially mechanical transformers and are of contoured construction for purposes including providing a suitably proportioned end for joining tangentially to the torsional reed 14 and also providing for an increase in the amplitude of longitudinal mode vibration, as will be explained more fully hereinbelow. As aforesaid, each of acoustical coupling members 22a–d has a physical length equivalent to an acoustical length of an integral number of one-half wavelengths in the material of which it is made at the design frequency for the apparatus.

Each of acoustical coupling members 22a–d may comprise a single member or, for purposes of manufacturing or other engineering convenience, it may comprise as shown two tapered members joined in end-to-end contact, the tapered portions by means of their increasingly smaller cross section affording the increased amplitude. The tapered portions may be shaped so as to provide a linear taper, for example, or a taper that is an exponential function of its length and satisfies the following equation:

$$S = S_o e^{-2Tl}$$

where S is the reduced area at any section of the tapered portion, $S_o$ is the area of the untapered portion, T is a constant describing the taper, and $l$ is the length of the tapered portion. This equation and the boundary conditions for resonance of couplers such as couplers 22a–d are set forth at page 163 of Piezoelectric Crystals and Ultrasonics by Warren P. Mason, published in 1950 by D. Van Nostrand Company.

In accordance with principles well known to those skilled in the art, for efficient operation as for avoiding changes in sound velocity, mode, etc., the solid-portion-diameter cross section of each of coupling members 22a–d is preferably no more than about one-quarter wavelength.

The torsional reed 14 comprises a cylindrical tube or rod which is preferably removably supported by the mass 12. The torsional reed has, as aforesaid, a length equivalent to a whole number of one-half wavelengths in torsion at the design frequency according to its material and geometry. As disclosed, for example in U.S. patent application Serial No. 739,555 the torsional reed may be dimensioned in accordance with the following equation:

$$f_1 = \frac{1}{2l}\sqrt{\frac{Q}{2\rho(\sigma+1)}}$$

where $l$ is the length of the reed 14 in centimeters, $\rho$ is the material's density in grams per cubic centimeter, Q is Young's modulus in dynes per square centimeter, and $\sigma$ is Poisson's ratio. The reed 14 may be made of the same material as is used for coupling members 22a–d.

The engagement between the mass 12 (which is essentially a collar) and the reed 14 occurs at a true torsional node on the reed 14, as at one-quarter wavelength in torsion or odd integral multiples of one-quarter wavelength in torsion from the free end 11 of reed 14 which extends through a clearance bore 13 in the mass 12. It is to be noted that the engagement between mass 12 and reed 14 is preferably remote from the tip 20 and from the locale where the couplers (22a–d) are attached to the reed 14. The flange 15 is an integral part of or is fixedly secured to the reed 14 by brazing, welding, or the like, and (positioned at a true node as aforesaid) is disposed within a counterbore in the mass 12 and is fixedly secured to said mass 12 by a plurality of bolts (not shown) or by brazing. The nodal location serves to render the apparatus essentially force-insensitive under operating conditions involving force application.

It is to be noted that the apparatus of FIGURE 1 (and FIGURE 3) involves vibratory mode conversion, from the longitudinal-mode vibration of the transducers (24a–d) and their associated acoustical couplers (22a–d) to the torsional-mode vibration of the reed 14.

This mode conversion involves certain problems (such as those relating to acoustical impedance matching, as will be explained below). However, in the present state of the art, such mode conversion is necessitated in practical apparatus for performing useful work vibratorily, since no torsional-mode transducers suitable for high-power-delivery applications of vibratory energy are known to be commercially available or to be readily extrapolatable for the purpose from available information on non-power-delivery torsional transducers (such as those used in communications, instrumentation, and other low-power units). Also, the use of a twist-drill-type end for reed 14 (as has been suggested to generate torsional vibrations in a longitudinal-mode-driven coupler, reed 14 being a type of coupling member), to date itself involves complicated associations of modes and does not provide a straightforward design approach to the achievement of torsional power delivery systems embracing a range of sizes and frequencies.

Concerning the attaching or coupling between the axial members (such as transducer 24a-coupling member 22a, and their counterparts) and the torsional reed 14, there are also kinematic or microkinematic problems (in addition to the acoustical impedance matching and mode conversion problems) associated with the axial motion of the longitudinal-mode coupler ends and the angular motion of the reed.

Figure 3:
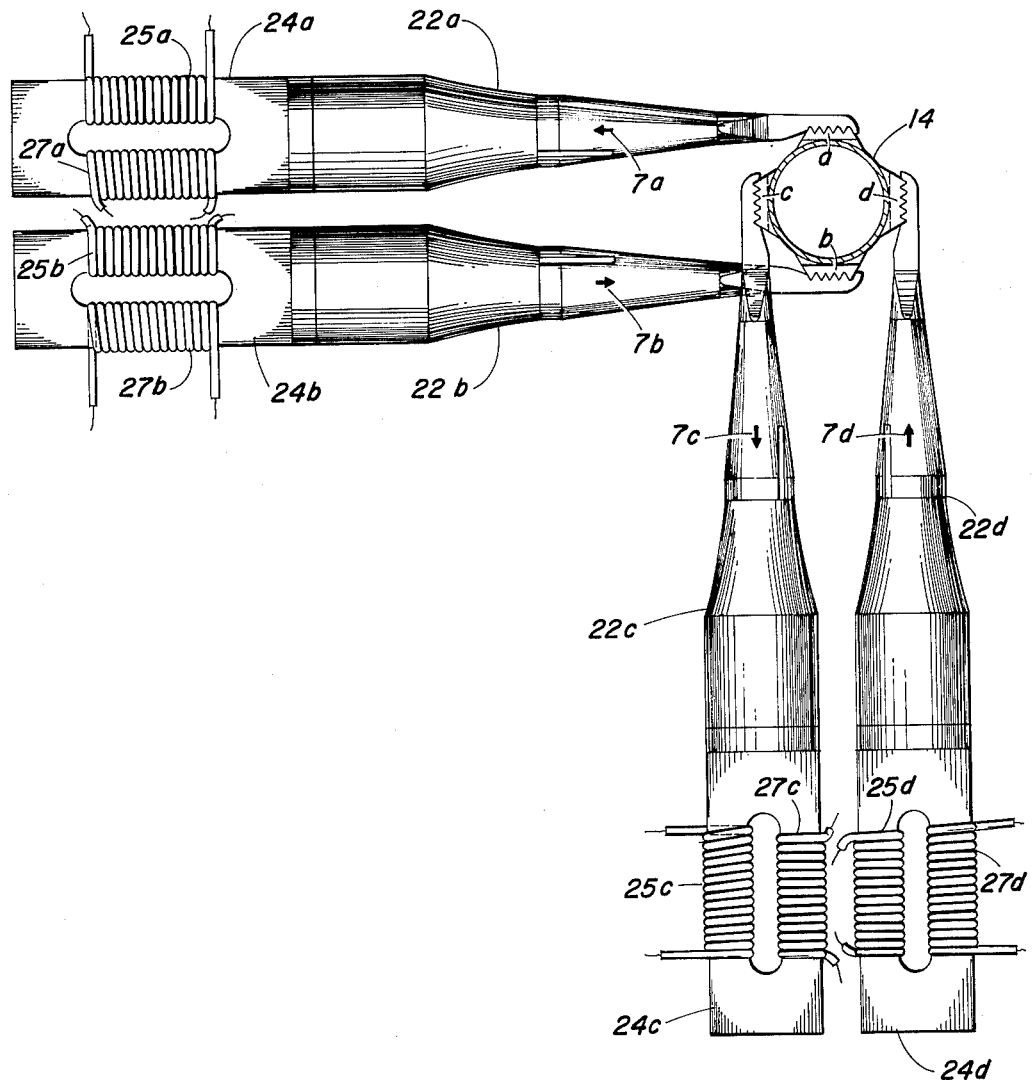
FIGURE 3 is a plan view of one embodiment of the apparatus of FIGURE 1 showing a four-transducer-coupling-system array and its attachment to the toothed bosses of the torsional reed of FIGURE 1.

As may be seen from FIGURES 1 and 3, the longitudinal-mode coupling members 22a–d are affixed tangentially (by means of a toothed and brazed connection) to the reed 14 and drive it in torsional vibration. Thus, the attachment is via the bosses 14a, 14b, 14c, and 14d, which bosses in FIGURES 4 and 5 are in the same plane (which is normal to the axis of the reed 14), while in FIGURES 1 and 3 the bosses are alternately in different planes so as to prevent couplers 22b and 22c from interfering with each other. Said bosses 14a–d on the reed 14 are evident in greater detail in FIGURE 1, where it can be seen that the couplers 22a and 22c, for example, engage through the toothed bosses 14a and 14c which are offset axially on a sculptured flange as is evident in the plane view of FIGURE 3. Similarly, couplers 22b and 22d are offset.

The specifics of this connection are important. For example, bolted connections introduce stress-raising effects in both members, undesirably affect acoustical impedance matching, and require permanent tightness. The toothed geometry illustrated provides a "hard" metallurgical junction between the metal of the axial members 22a–d and the torsional member 14, thereby essentially eliminating the properties of an ordinary flat brazed layer in shear, which not uncommonly absorbs energy, rises in temperature, and influences performance negatively.

Also, it has been found that the bending stress induced in the slender necks of the axial couplers 22a–d by the reed 14 (angularly oscillating in torsion about its axis) is less when the point of attachment is at a large radius from the center of the reed 14, and greater when it is at a smaller radius. In this connection it will be noted that the diameter of the torsional welds to be produced (and therefore of the welding tip) or the dies of torsionally excited metal-forming apparatus, torsionally-excited drawing dies, etc., may be considerably smaller than has heretofore been feasible or practical because of these problems, and because of this cyclic bending stress problem.

Thus, the present invention involves attachment of the axial couplers 22a–d to the reed 14 at the largest desired radius, and subsequent diameter reduction as the torsional energy approaches the work locale. The latter is accomplished by means of a torsional coupling member (having an exponential or other dimensioning relationship) adjacent the work.

Moreover, it is undesirable (to the extent of being virtually impossible) to metallurgically attach such a torsional coupling member to the reed, if one is to be able to change the dimensions of the end in contact with the work so as to be able to accommodate various work applications of one general kind or of different kinds and so as to match impedances into the work as is necessary. This is true in any torsional work-performing vibratory equipment, whether it be a torsional welding machine, a torsional punch on a press, a torsional die on a drawbench, etc. Therefore, the present invention provides for mechanical attachment of the torsional work-contacting coupling member, a special mechanical attachment means being provided in order to overcome the difficulties known to be associated with prior mechanical attachments in vibratory systems.

Thus, for purposes of the present invention, the reed 14 of FIGURE 1 is end-attached to one end of the torsional mode amplitude transformer 18, with the attachment details having considerable significance for efficient performance.

To the other end of transformer 18 of FIGURE 1 is attached a welding tip 20. The tip 20 thereby executes torsional vibration in a plane essentially parallel to the weld interface. As may be seen more clearly in FIGURE 2, the weldment members 27 and 29 are positioned intermediate the tip 20 and the anvil assembly 26. During delivery of vibratory energy to the weldment, clamping force is applied between the tip 20 and the opposing support anvil 26 by means of a force system which may be actuated hydraulically, pneumatically, or mechanically, as by a connection to the mass 12 and via the anvil assembly 26.

For welding purposes, the tip 20 clamps the metal members 27 and 29 together with a force in a direction and of a magnitude to hold the members 27 and 29 in intimate contact at the intended weld zone. This force is indicated on FIGURE 2 by the arrows $F_1$ and $F_2$.

The tip 20 is provided with an annular work-engaging face (see FIGURES 6, 7, and 8 and 6A, 7A and 8A) and is preferably metallurgically bonded to the acoustical transformer 18. The annular work-engaging face of the tip 20 is in abutting contact with workpiece 27 during welding. The tip 20 is dimensioned for torsional vibration as a part of the transformer 18, as is within the skill of the art. The tip 20 may be made of the materials above described, or it may be made of other materials (usually harder materials), such as those chosen principally for the work application per se, rather than for their acoustical properties, provided that such change in material for the tip 20 is taken into consideration in connection with the design of the transformer 18 and of the apparatus 10 for efficient operation at substantially a resonant frequency.

Said anvil assembly 26 is, as aforesaid, noncompliant in torsion at the frequency of operation of the machine; thus, it may be powered or non-powered but in any event is torsionally rigid, i.e., noncompliant, with respect to the peripheral oscillations of the tip 20, being both non-responsive to excursions of the tip and sufficiently rigid to provide the clamping force mentioned above which must be sufficient to maintain the workpieces in intimate contact at the intended weld zone and to couple mechanical vibratory energy into said zone.

Such force for maintaining the workpieces being welded in regulated alignment and firm contact may be varied over a wide range, which may be readily ascertained by the user. In a preferred embodiment, the maximum clamping forces need not produce an external deformation of more than about ten percent in weldments effected at room or ambient temperatures. (By deformation is meant the change in dimensions of the weldment adjacent the weld zone divided by the aggregate dimensions of the weldment members prior to welding; result multiplied by 100 to obtain percentage.) In many cases the extent of deformation is appreciably below 10% and in some instances may be virtually absent altogether.

The method and apparatus of the present invention may be used to form ring-type or unwelded-center spot welds and is also applicable to forming seam welds which are accomplished by overlapping said ring-spot or unwelded-center-type welds.

Welding in accordance with the present invention may be accomplished within a wide time range, such as a time range of between about 0.001-second to about 6.0 seconds, with welding under most normal conditions being effected during as brief a time interval as possible for a given application, such as the making of a weld of a given strength.

Available ultrasonic welding data indicate that, although meticulous attention to surface preparation is not necessary (for welding per se as opposed to reproducible and quality welding), oxide-free and degreased surfaces respond more readily to welding, as a general rule.

A wide variety of materials may be welded together by means of the present invention, including especially metals and alloys, although various metallic, semimetallic, and nonmetallic combinations may be made.

Research has shown that the temperature rise commonly observed in ultrasonic welding of metals is in the range of 35%–50% of the homologous melting temperature. In most cases, this is below the temperature at which metal recrystallization takes place, and temperatures during welding can usually be controlled within limits that are probably adequate to preclude recrystallization where desirable.

As may be seen more clearly in FIGURE 2, attachment of the transformer 18 to the reed 14 is effected by a pair of abutting flanges, flange 16 being an integral end portion of reed 14 and flange 17 being an integral end portion of transformer 18.

In order to permit the welding machine to be useful in making ring welds of varying diameters (as between ¼-inch-diameter and 2½-inch-diameter with the machine being described, which operates at 15 kc.), with an effective acoustical impedance match between the welding tip 20 and the members being welded (as by providing adequate peripheral displacement to effect an impedance match), the diameter of the tip 20 must necessarily be changed and the inside and outside diameters of transformer 18 must also be changed.

Thus, the present invention contemplates drastically increasing the capabilities of a given machine by enabling it to accommodate a series of transformers 18 having various sizes to accommodate various tip diameters and weld impedances.

For effective transmission of cyclic torsional forces across the interface between flange 16 and flange 17, (i.e., without significant loss of vibratory energy or other problems), it is important that an essentially positive mechanical drive occur. Thus, the teeth at the interface between flanges 16 and 17 are more or less radial (see, for example, FIGURES 9, 10, and 11). The teeth are maintained in engagement by a series of peripherally disposed bolts or cap screws 19 which, when tightened, serve to pull the flanges 16 and 17 together and maintain the toothed interface in intimate connection. In the case of welding, this intimate meshing is augmented by the welding clamping force, which also serves to force the teeth into still more intimate engagement. ("More or less radial" disposition of the teeth is indicated, since for purposes of increasing manufacturing convenience and lessening manufacturing expense, gang milling of the teeth may be resorted to, rather than exactly-radial tooth-by-tooth machining.)

The tip 20 is preferably attached to the end of transformer 18 by a brazed joint of relatively large area (as at 21 of FIGURE 2). The large area of braze will satisfactorily transmit welding forces (or drawing forces, if tip 20 is a draw die) because of its comparatively large area, and with this braze joint the tip can be maintained as a semi-permanent part of transformer 18. The tip 20 can be attached with positive mechanical connections (similar to the joining of flanges 16 and 17), but in many cases this part is relatively quite small and smallness magnifies the mechanical problems.

It will be appreciated that, while the apparatus 10 may be used for certain applications (such as relatively low-power applications when provided with only one transducer 24a) and one coupling member (such as member 22a), a larger number of transducer-couplers is generally more suitable for higher-power applications and for assurance of uniform powering about the periphery of torsional reed 14.

As will be understood by those skilled in the art, torsional motion is effectively produced in the reed 14 by appropriate phasing of the axial drive from transducers 24a–d of FIGURES 1 and 3. Thus, in the configuration illustrated in FIGURE 3, transducers 24a and 24c are in phase with one another, as shown by the arrows designated 7A and 7C. Transducers 24b and 24d are also in phase with each other, as indicated by the arrows 7B and 7D. However, the pair of transducers 24a and 24c are out of phase with the transducers 22b and 22d.

This can be accomplished electrically by straight-forward and well known methods, or it may be accomplished mechanically, as indicated in FIGURE 4, by displacing the position of the driving transducers 24a and 24b by one-half wavelength of the coupling members 22a and 22b as shown. As illustrated in FIGURE 5, the appropriate phasing of the axial driving members can also be accomplished by displacing their position 180 degrees, as is illustrated by the couplers 22a and 22b of FIGURE 5.

Figure 8:
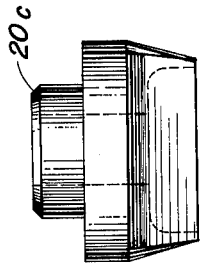
FIGURES 8 and 8A are a side view and an end view respectively of a rectangular welding tip in accordance with the present invention.
Figure 7:
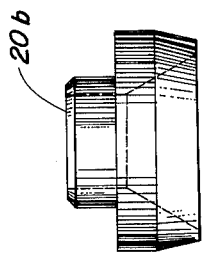
FIGURES 7 and 7A are a side view and an end view respectively of a circular welding tip in accordance with the present invention.
Figure 6:
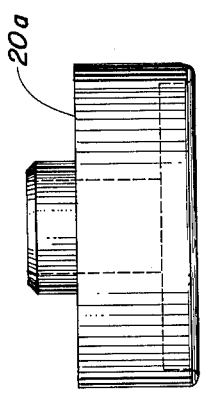
FIGURES 6 and 6A are a side view and an end view respectively of a non-circular welding tip in accordance with the present invention.

FIGURES 6, 7 and 8 illustrate representative types of torsional welding tips which can be attached to torsional transformer 18.

Figure 6A:
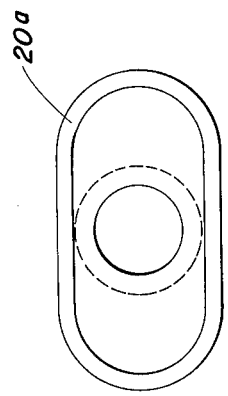

FIGURE 6 is the side view of a non-circular welding tip, the axial view of which is shown in FIGURE 6A. Such a tip will produce a weld corresponding to the shape of FIGURE 6A.

Figure 7A:
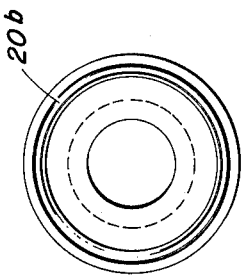

FIGURE 7 produces a circular weld, as will be evident from FIGURES 7 and 7A, at the tip periphery designated 20b.

Figure 8A:
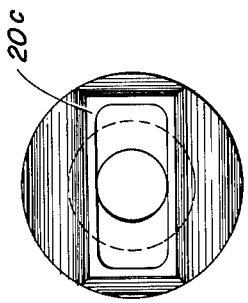

FIGURE 8 illustrates a rectangular perimeter tip which will produce a weld of rectangular shape, as is evident from FIGURE 8A.

It will be clear that welds having other perimeters can be produced (as, for example, triangular welds, welds with either interrupted or continuous circular or non-circular perimeters, etc.).

For a description of the type of ceramic transducer illustrated in FIGURE 5, see United States patent application No. 292,695, filed July 3, 1963 in the names of James Byron Jones and Nicholas Maropis and entitled "Transducer Assembly."

Charted below are several examples of torsional welding performed in accordance with the present invention, utilizing a 15 kc. torsional welding machine such as that illustrated and described herein.

the motional amplitude of the work-contacting tip at a known frequency of vibration, the force against which that velocity operates is not yet thoroughly or widely known. Therefore, such measurement has previously been an interesting curiosity, but prior to the present invention the situation has not been sufficiently controllable or adjustable to be of practical utility to either the maker or the operator of the equipment, at least for equipment operating in the torsional mode.

An "amplitude transformer" has been defined as a body which, when in "free" resonance, has a pair of strainfree surfaces at one of which the amplitude is much larger than at the other, so that the body can then be driven at the low-amplitude surface by a resonating transducer to give magnified vibration at the high-amplitude surface. It has also been said that, considering the conservation of momentum, it can be seen that in any useful amplitude transformer the cross-sectional area near the low-amplitude end must be much bigger than that near the high-amplitude end.[1]

Thus, a mechanical transformer for a vibratory system might be likened to a lever, such as is normally used for single movements against static-like forces. If the transformer is a lever, the transducer may be compared with the hands of the operator of the lever, with the work-contacting end of the transformer opposite the operator's hands.

It is known to those skilled in the art that various acoustical transformer configurations offer different combinations of tip acceleration and displacement. It is also apparently known to some, at least in theory, that there is an inverse relationship: i.e., increasing tip acceleration and displacement decreases force, and vice versa.

It has been proposed heretofore (as set forth in the book by Mason above indicated) to use mechanical transformers in vibratory equipment. These are usually described as velocity transformers or amplitude transformers (i.e., linear displacement multipliers, inasmuch as linear displacement is from a large end to a small end). These transformers (for use with the longitudinal mode of vibration, so far as is known) have been used in many kinds of equipment, including ultrasonic drills, soldering irons,

| Weldment | | | | Configuration | Power (watts) | Clamping Force (lb.) | Time (secs.) |
| --- | --- | --- | --- | --- | --- | --- | --- |
| Adjacent to Sonotrode | | Adjacent to Anvil | | | | | |
| Material | Gage (in.) | Material | Gage (in.) | | | | |
| 3003 H-18 | .012 | 1100 Al | .020 | Covers on canisters, circular weld, 1⅜ O.D., .040 annulus. | 5,400 | 200 | .68 |
| Cu-flashed steel | .012 | Cu plate | .100 | Hat-type covers to plate, ½" I.D., 0.030 annulus. | 1,600 | 850 | .80 |
| 3003 H-19 Al | .005 | 3003-O | .010 | Flat covers on flanged containers, racetrack shape, 1.060 in. long, .497 in. wide inside, .019 in. annulus. | 2,200 | 450 | .12 |
| 1145 H-19 Al | .003 | 5052 | .008 | Can cover welding, 2 9/16 mean dia., 0.030 annulus. | 5,400 | 1,200 | .6 |
| 5052 H-36 | .004 | Copper | .004 | Flat sheets, square weld, ½" x ½" outside, 0.030 annulus. | 5,000 | 1,000 | .2 |
| 1100 Al | .012 | Gold plated, Cu clad mild steel. | .012 | Flat pack circuit components 1" x 1" outside, 0.040 annulus. | 8,400 | 1,500 | .15 |

As will be appreciated by those skilled in the art, under load conditons power (into the transducer) is a factor which is readily and widely controllable and adjustable by the operator of a vibratory work-performing apparatus, whereas amplitude of vibration per se is not, as a practical matter.

Thus, the amplitude of vibration is inherently related to the characteristics of the components of a vibratory apparatus (such as the parts of a transducer-coupling system), the power applied to the unit (usually expressed as electrical watts input to the transducer), the transient properties of the materials being treated (especially if they are solid materials), etc.

While velocity may be determined by measurement of cleaners, welders, etc. Often, horn transformers have been used, especially tapered horns, with tapers of various types being possible of use in certain situations (such as straight, exponential, catenoidal, gaussian, or stepped tapers).

Such horns have several advantages. For example, the electromechanical transducers (magnetostrictive, piezoelectrical, cerimac, etc.) so commonly used for ultrasonic or sonic apparatus have a characteristically high mechanical or acoustical impedance. That is, they are relatively rigid and vibrate at so-called ultrasonic fre-

[1] This is not necessarily true of the transformer 18 of the present invention, at least in theory.

quencies with very small amplitude levels but relatively large force levels. Such high impedance units are undesirable (whether alone or combined with an acoustical coupling member of similarly high acoustical impedance, as would be necessary for low loss transmission of vibratory energy from transducer to acoustical coupling member) for purposes of efficiency transmitting vibratory energy to a low acoustical impedance material such as a liquid.

A better acoustical impedance match (good acoustical coupling) is therefore obtained with a mechanical transformer such as the tapered horn, which provides larger amplitude levels (but with relatively smaller force levels). There are often disadvantages, of course, in the smaller work-contacting tip of the horn end in the lower force levels, and no universally satisfactory solution has heretofore been proposed for either disadvantage. However, the lower force levels are generally of no great concern in the ultrasonic treatment of liquids, at least, inasmuch as such treatment is generally of the indirect type (i.e., wherein the work is really performed by cavitation forces developed in the liquid as a result of vibratory energy application, and wherein production of cavitation generally does not require large force levels).

It is to be noted that the concept of mechanical or acoustical impedance is important for other aspects of the vibratory system. Thus, acoustical impedance at any given point in a mechanical elastically vibrating system is the ratio of cyclic force acting at that point to displacement velocity at that point. A region of high acoustical impedance, then, is one at which cyclic force amplitude is maximum (as at a velocity node or a stress antinode) but displacement velocity and thus vibration amplitude is minimum. Conversely, a region of low acoustical impedance (as at a velocity antinode or a stress node) has minimum cyclic force amplitude and maximum displacement velocity and vibration amplitude.

It is to be noted also that strain and shape factors for the mechanical transformer place limitations upon the maximum vibration or displacement amplitude actually obtainable under practical rather than theoretical conditions. That is, at a given power level, the maximum amplitude of any such resonant element (i.e., an element having a length of an even multiple of one-quarter wavelength, which presupposes that its largest material diameter is less than one-half wavelength and preferably less than one-quarter wavelength, for the frequency of operation in the material used for the element) varies linearly with the maximum allowable stress (which is a mechanical property of the transformer material), inversely with modulus and density (which are physical properties of the material), and inversely with the frequency of vibration.

However, the maximum practical amplitude obtainable is not always suitable for certain applications. Rather, it has been found that an amplitude less than the practical maximum is often desirable and sometimes necessary, as in certain ultrasonic welding applications.

So far as is known, prior to the present invention, practical mechanical transformers or horns were constructed to operate solely in the longitudinal (extensional) mode of vibration, so that their physical length (usually expressed as an acoustical one-half wavelength or a unit multiple thereof) has depended on the area distribution along the axis of the transformer. That is, the transformer ratio in a longitudinal-mode mechanical transformer is the square root of the ratio of the respective areas of the two ends of the transformer, and the value of the transformer ratio is the amount by which the linear displacement or the amplitude or the particle velocity is increased from one end to the other, i.e., from the large end to the small end.

Exponential and straight tapers have been those most widely used, and a variant of these has been the "inside-out" type wherein the outer configuration is uniformly tubular but the inner configuration is tapered (it will be appreciated that material area distribution along the axis of the transformer is still involved). Another variant is the stepped coupler, which, instead of having a regular and smooth transition from large end to small end, has abrupt transition sections and therefore abrupt discontinuities in mass distribution.

The transformer 18 of FIGURES 1 and 2 is a torsional impedance-tranforming acoustical coupling element of the type having an axis of rotational symmetry, such as one whose radial dimensions vary with position along the axis (as, for example, a tube having a variable inner radius $r$ and a variable outer radius $R$).

For such a torsional coupling elements, it has been found that it must be designed, not on the basis of area ratios or the square root of area ratios, but on the basis of variation of the moment of inertia (which is the second moment of area) of the section of the torsional coupling element about the axis.

For example, to design such a torsional coupling element having an exponential taper (which is the taper of integral half-wavelength serving as an ((ideal) impedance transformer without introducing an additional reactive component in series with the transformed impedance), the following equation is used:

$$I = I_i e^{-\alpha X}$$

where $I_i$ is the second moment of area for the input end, $e$ is the base for natural logs, $\alpha$ is the taper factor, and $I$ is the second moment of area at any axial distance $X$.

Thus, if $$X = l$$

wherein $l$ is the axial distance from the input end to the output end, then $$I_o = I_i e^{-\alpha l}$$

where $I_o$ is the second moment of area at the output end.

For a hollow circular cross section, the second moment of area about the polar axis $= \pi/2(R^4 - r^4)$.

Transformer ratios of from 1:1 to 1:13 have thus far been built or designed in accordance with the transformer 18 of the present invention, and others appear to be possible of use.

It is to be noted that, while the torsional transformer 18 of the present invention is herein illustrated and described as having an external taper (in association with a hollow interior), it may be constructed, via the same equations, to have an external cylindrical configuration and an internal taper.

A hollow interior for the transformer 18 of the present invention, aside from the various dimensioning advantages aiding in the solution of various problems, has particular advantages in view of the nature of torsional vibration itself. It also has certain practical advantages, in that the hollow offers a safety path in conjunction with work with explosive materials (especially if the reed 14 is hollow), and in that compressed air may be introduced into the hollow for purposes of pushing the work away from the end of the tip 20 on completion of the operation.

In general summary, then, attempts to provide reduced-diameter welds (or tips or dies) with the torsional reed system of the above mentioned Patent 3,184,841 (wherein the angular excursion is more or less fixed) will result in an undesirably reduced peripheral displacement distance in proportion to the radius. However, and as has been explained in connection with the present invention, a reduced output diameter is very desirably arranged so as to provide for an angular displacement toward the output end of the system which is increased at least to the point where peripheral displacement remains about the same.

Attempts to increase torsional displacement by adding more power aggravate the microkinematic problem discussed above, whereas the present invention solves not only the microkinematic problem, but also the peripheral displacement, acoustical impedance matching, and other problems as well. The thereby-enabled larger diameter for the reed provides smaller angular and peripheral displacements, which reduced displacements reflect lessened flexural displacements back into the axial driving members with lessened potential for joint failure. The replaceable transformer 18 provides the increased displacement at the output end as necessary for a given application.

Thus, it will be seen that the present invention provides an effective, convenient, relatively inexpensive means for easy alteration of a vibratory welding system to produce varying ring weld diameters or ring welds between materials having widely differing properties, thicknesses, etc. In addition, the present invention may be used in other vibratory work-performing situations wherein such an amplitude transformation arrangement would be suitable.

The present invention may be embodied in other specific forms without departing from the spirit or essential attributes thereof and, accordingly, reference should be made to the appended claims, rather than to the foregoing specifications, as indicating the scope of the invention.

It is claimed:

1. A transducer coupling system comprising a torsional resonant reed, vibratory energy transmitting means coupled at a substantially low-stress area on said reed for torsionally vibrating said reed, an impedance matching hollow transformer, one end of said transformer being coupled to one end of said reed by a joint substantially assuring uniform distribution of stresses, said transformer being resonant-frequency-dimensioned and tapered as a function of its moment of inertia.

2. A transducer coupling system comprising a torsional resonant reed, vibratory energy transmitting means coupled at a substantially low-stress area on said reed for torsionally vibrating said reed, and an impedance matching hollow torsional transformer, one end of said transformer being coupled to one end of said reed by a joint substantially assuring uniform distribution of stresses, said transformer being capable of increasing the angular displacement of the torsional vibration emanating from said reed, said transformer being resonant-frequency-dimensioned and tapered as a function of its moment of inertia.

3. A system in accordance with claim 2 wherein said one end of said torsional transformer has a cross sectional configuration of said one end of said reed, said joint including meshed serrations on said reed and transformer, and the other end of said transformer being free for attachment to a work performing tip.

4. A system in accordance with claim 2 including means for applying a static force to said reed and transformer in an axial direction thereof.

5. A system in accordance with claim 2 including a welding tip on said other end of said torsional transformer, a non-compliant anvil, weldment members being adapted to be supported in intimate contact on said anvil with one member contacting said tip, and the energy level of the energy introduced into said one member by said tip being sufficient to effect a weld between said members.

6. A transducer coupling system comprising a resonant torsional reed, first means for imparting axial vibratory energy to said reed, second means coupling said first means to said reed at spaced points therearound at a low-stress area on said reed for torsionally vibrating said reed, an impedance matching mechanical transformer, said transformer being a tapered hollow resonant member, and means removably coupling one end of said transformer to said reed adjacent said low-stress area in a manner substantially assuring uniform distribution of stresses and continuity of torsional vibratory energy transmitted from said reed to said transformer, and means secured to the other end of said transformer for performing useful work.

7. In a transducer coupling system comprising
   (a) a resonant reed,
   (b) means coupled to said reed to cause said reed to vibrate in torsion,
   (c) a tapered resonant impedance matching hollow mechanical transformer,
   (d) means removably coupling the larger end of said transformer to said reed adjacent a low-stress area on said reed in a manner substantially assuring uniform distribution of peripheral shearing stresses and continuity of torsional vibratory energy to be transmitted from said reed to said transformer, and
   (e) said transformer being tapered as a function of the moment of inertia at spaced points therealong so that the angular displacements of its ends are different.

8. A torsional mechanical transformer adapted to be removably coupled in an acoustical coupling system comprising
   (a) an exponentially tapered resonant hollow body having input and output ends
   (b) the cross sectional area of said body at any distance X from said input end satisfying the equation:

$$I = I_i e^{-\alpha X}$$

wherein $I_i$ is the second moment of area for the input end, $e$ is the base for natural logs, $\alpha$ is the taper factor, and $I$ is the second moment of area at any distance X.

9. A transformer in accordance with claim 8, including means on said input end of said body for enabling said body to be removably coupled in a coupling system.

10. A transformer in accordance with claim 9, wherein said means include serrations on said input end of said body.

11. A mechanical transformer for coupling vibratory energy in the torsional mode from a source of torsional vibratory energy to a work locale comprising a hollow metallic member having toothed serrations at the end juxtaposed to the source of torsional vibratory energy, said hollow metallic member being resonant-frequency-dimensioned and tapered as a function of its moment of inertia, and a work-contacting die at the end of the transformer opposite to its end contacting the source of torsional vibratory energy, said die being made of a different metal than the metal of said transformer, said die being metallurgically attached to said transformer.

12. A mechanical transformer in accordance with claim 11 wherein the diameter of the work-performing die face is less than the inside diameter of the end of said transformer abutting said source of torsional vibratory energy.

13. A mechanical transformer in accordance with claim 11 wherein said toothed serrations are interrupted by holes for tie bolts.

14. A method of delivering vibratory energy to a work area comprising the steps of introducing longitudinal mode vibratory energy into a resonant reed at a low stress area, causing said vibratory energy to torsionally vibrate said reed, coupling the torsional vibratory energy of said reed to a work performing member by a hollow mechanical transformer so that said member is torsionally vibrated thereby in a manner without substantially interfering with uniform distribution of peripheral shearing stresses therein, amplifying the angular displacement of the torsional vibration transmitted to said member from said reed by said transformer, and then performing useful work with the amplified torsional vibrations of said member.

15. In a method of delivering vibratory energy comprising the steps of introducing longitudinal mode vibratory energy into a resonant reed at a low stress area, causing said vibratory energy to torsionally vibrate said reed, amplifying the angular displacement of torsional vibration, said amplifying step including transmitting the torsional vibration through a torsional mechanical transformer having its cross-sectional area decreasing in a direction away from said reed as a function of the moment of inertia of said transformer about its longitudinal axis so that:

$$I = I_1 e^{-\alpha X}$$

where $I_1$ is the second moment of area at the end of the transformer adjacent said reed, $e$ is the base for natural logs, $\alpha$ is the taper factor, and $I$ is the second moment of area at any axial distance X from said end.

References Cited by the Examiner

UNITED STATES PATENTS 3,131,515  5/1964  Mason _____ 228—1

JOHN F. CAMPBELL, *Primary Examiner.*

WHITMORE A. WILTZ, M. L. FAIGUS,
*Assistant Examiners.*